Figure 3:
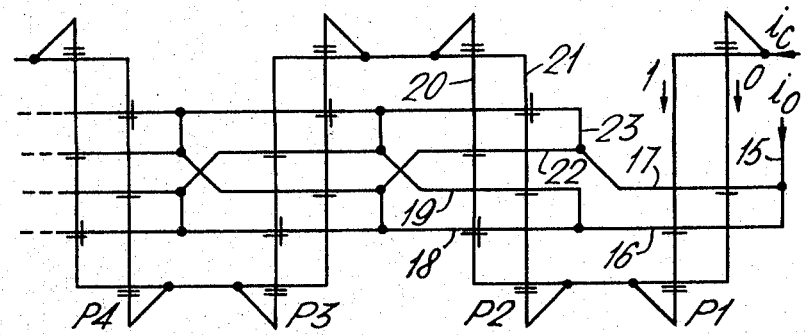

Jan. 17, 1967  M. G. HARMAN  3,299,283
SUPERCONDUCTIVE CIRCUITRY
Filed March 6, 1963  8 Sheets-Sheet 1
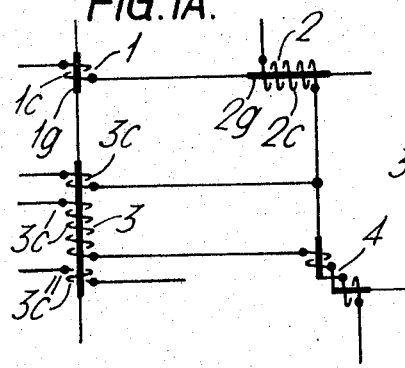
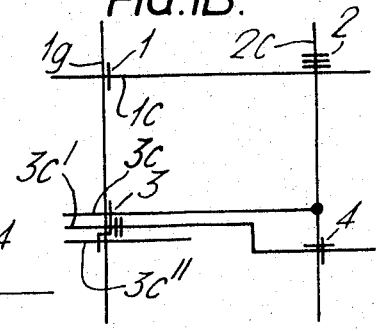
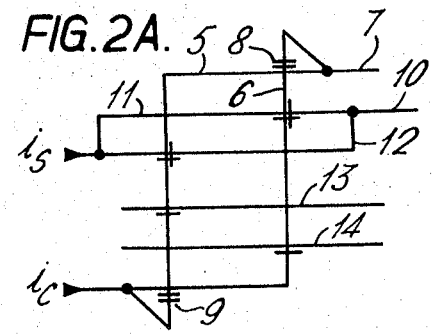
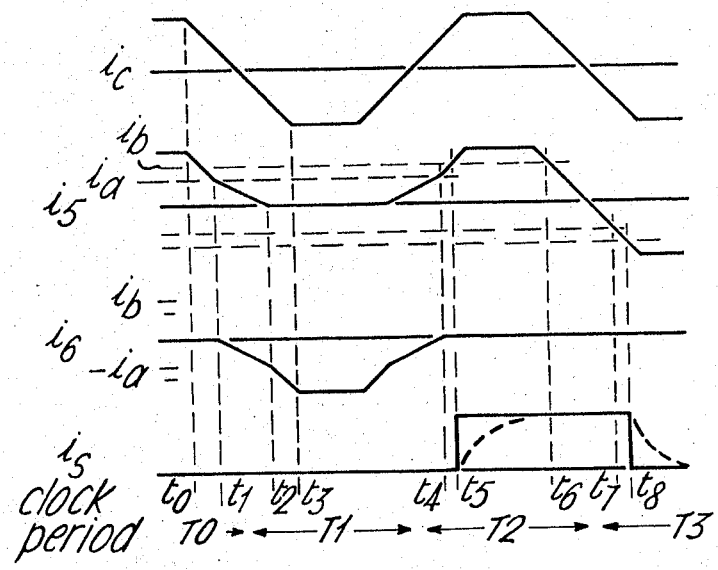

United States Patent Office 3,299,283
Patented Jan. 17, 1967

3,299,283
SUPERCONDUCTIVE CIRCUITRY
Michael Godfrey Harman, London, England, assignor to
The National Cash Register Company, Dayton, Ohio,
a corporation of Maryland
Filed Mar. 6, 1963, Ser. No. 263,270
Claims priority, application Great Britain, Mar. 30, 1962,
12,265/62; Jan. 14, 1963, 1,584/63
18 Claims. (Cl. 307—88.5)

The present invention is concerned with superconductive circuitry, and finds particular application in logical and arithmetic circuits in digital computers.

It is generally possible to regard the logical and arithmetic circuits of a digital computer as a set of flip-flops interconnected by logical circuitry so that, at a clock signal separating two clock periods, each flip-flop assumes a new state dependent only upon some logical function of the states of all flip-flops in the preceding clock period, each logical function being defined and mechanized by the input circuitry of the respective flip-flop. Considerable difficulties often prevent this scheme from being workable in this elementary form, however. These difficulties arise from the fact that as the switching of the flip-flops occurs, the input signals thereto will change and tend to affect the switching. It is highly undesirable to rely upon transient phenomena, and some form of intermediate storage or memory is therefore often used to overcome this problem, by delaying the outputs of the flip-flops so that the new states cannot affect the inputs until switching has been completed. This procedure is also undesirable or inapplicable in many cases, however, and a second method has been used in these cases.

This second method consists in dividing the flip-flops into several groups, and arranging the interconnecting circuits so that the flip-flops of each group are controlled by only a single preceding group. The several groups are switched sequentially, so that the total number of switching steps or phases required to change the information just set up in any selected group of flip-flops is equal to the number of groups. An example of this is the three-phase parametron system; other examples are given by those systems of magnetic core logic known as "two core per bit" systems.

Cryotron systems have been proposed using various multi-phase arrangements, and in particular a two-phase system has been described briefly in the section on cryotrons at pages 432 to 437 of "Digital Computer Components and Circuits," by R. K. Richards (D. Van Nostrand, 1957). In this system, the interconnecting logical circuits are arranged in two electrically separate sets, each set being controlled by one group of flip-flops and controlling the other group. The two sets of interconnecting circuits are energized alternately to effect the transfer of information between the two groups of flip-flops. This book also points out that it is desirable to arrange cryotron logical circuits so that a superconductive path always exists across each source of current.

Multi-phase systems are disadvantageous in that they obviously require more equipment and are inherently slower than single phase systems. A major object of the present invention, therefore, is to provide a superconductive circuit which permits a one-phase system to be implemented.

The present invention, in its broadest aspect, comprises superconductive logical circuitry so constructed and arranged that the logical state thereof is advanced by the reversal of at least one of the supply currents thereto. Further features of the invention relate to the construction and operation of individual flip-flops and multistable circuits, to the combination of such individual circuits into logical and arithmetical circuits, and to means for controlling the reversals of the supply currents.

Figure 4:
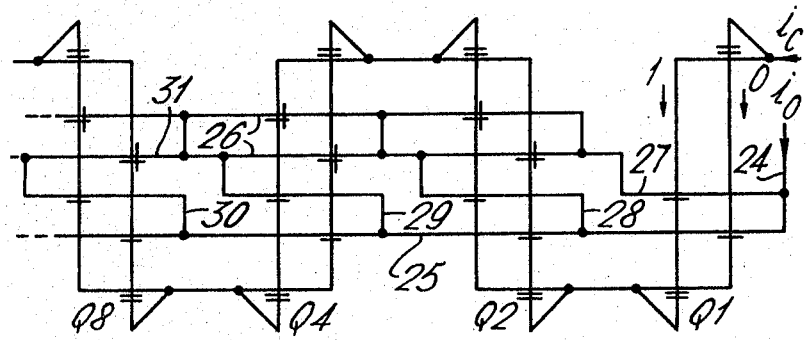
Figure 5:
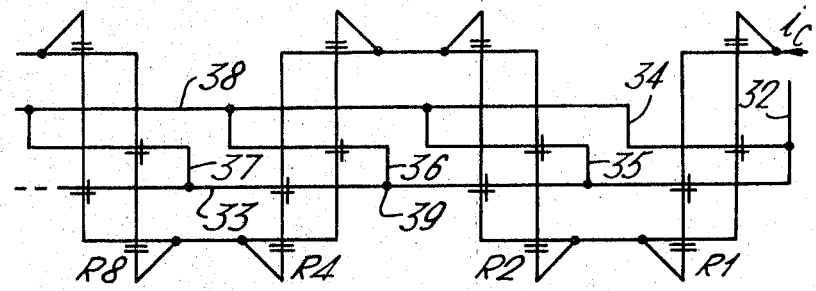
Figure 6:
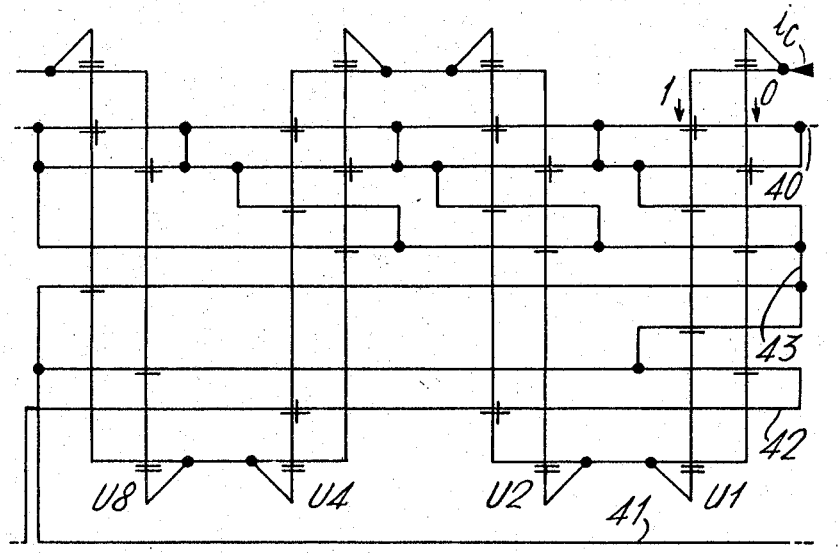
Figure 7:
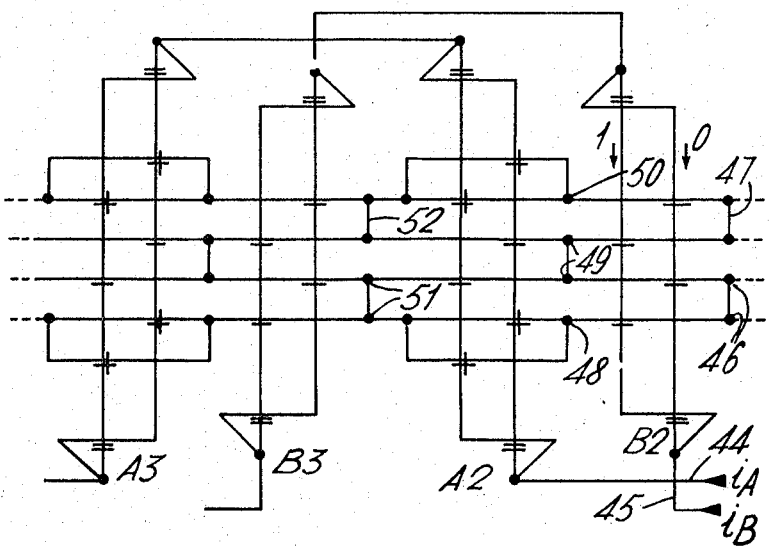
Figure 8:
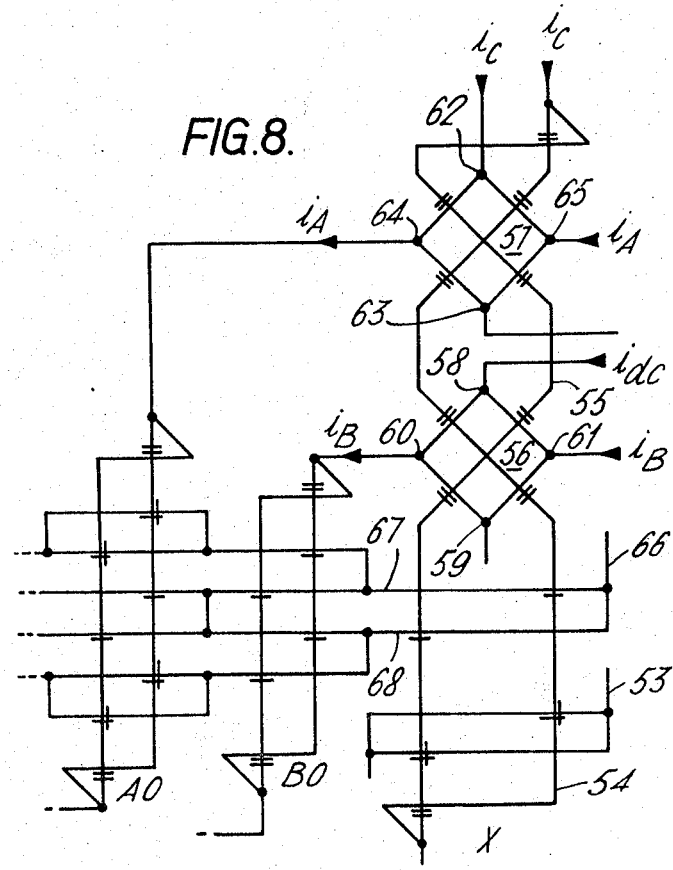
Figure 9:
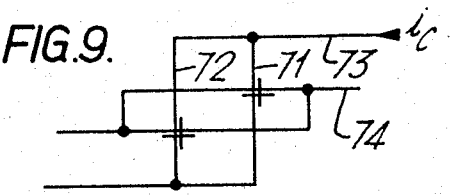
Figure 10:
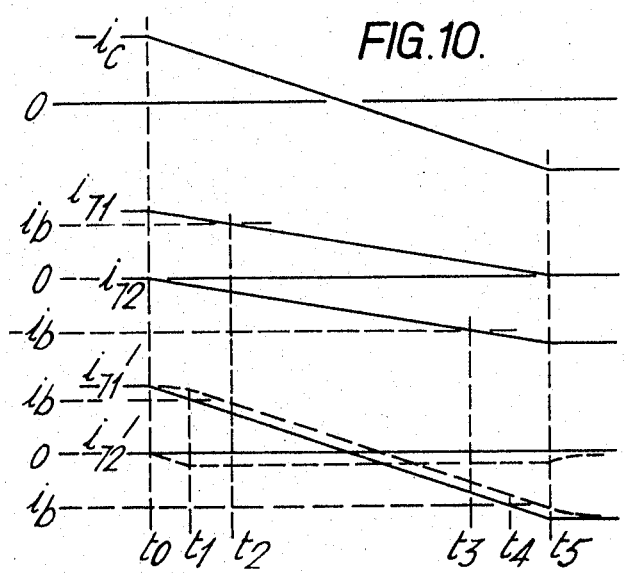
Figure 11:
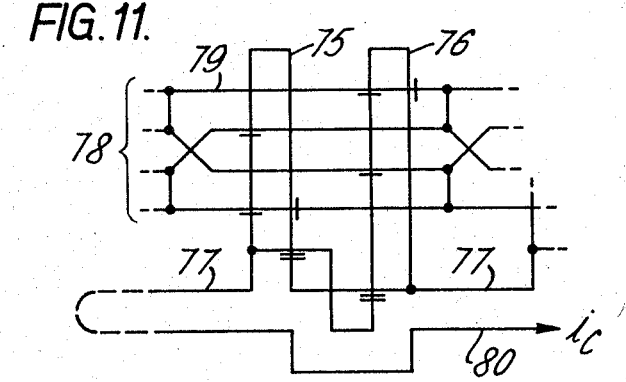
Figure 12:
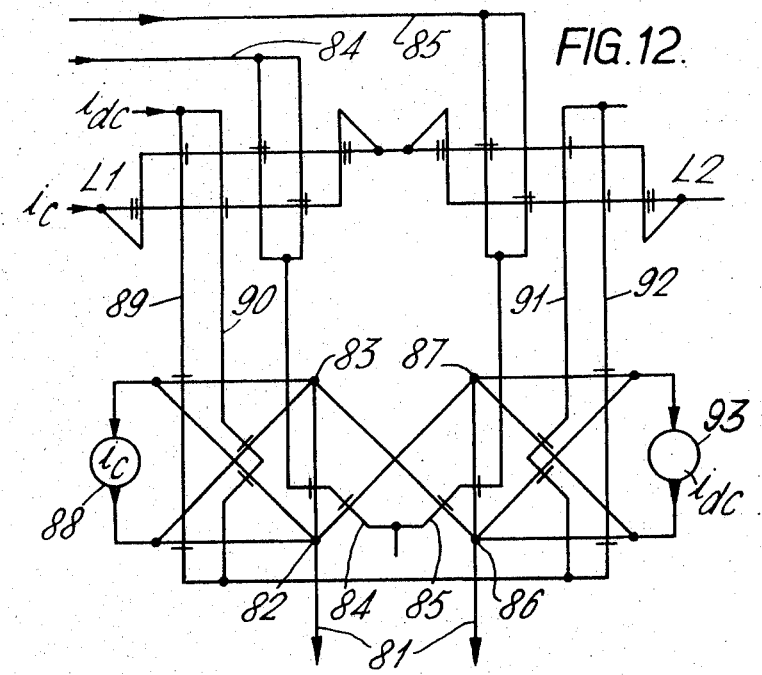
Figure 13A:
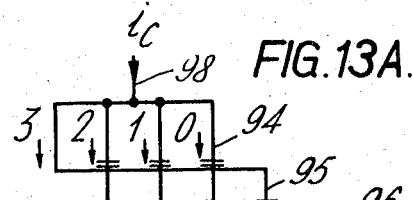
Figure 13B:
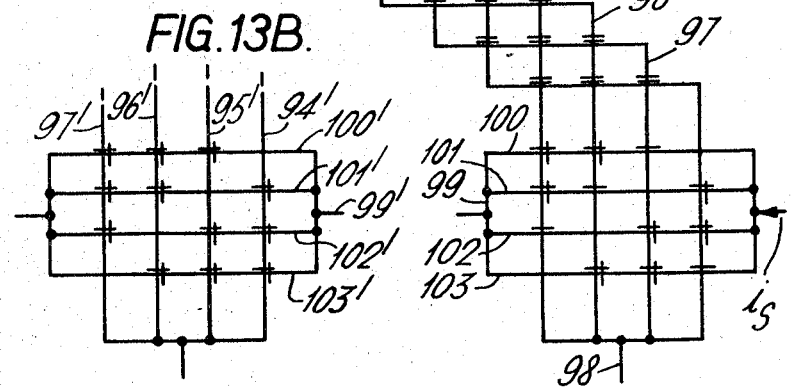
Figure 13C:
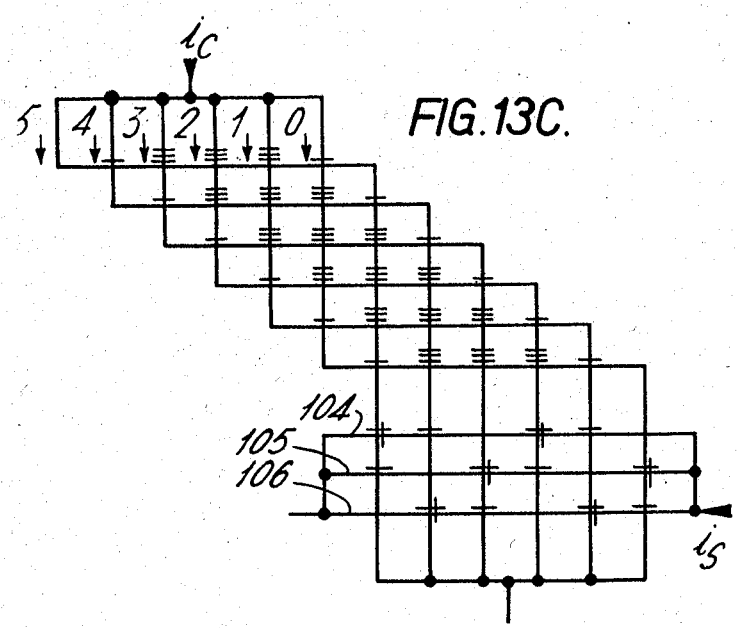
Figure 15:
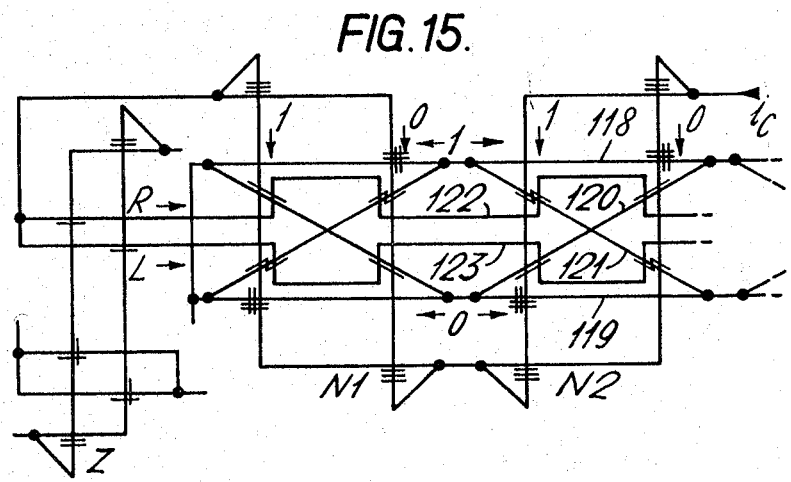
Figure 14:
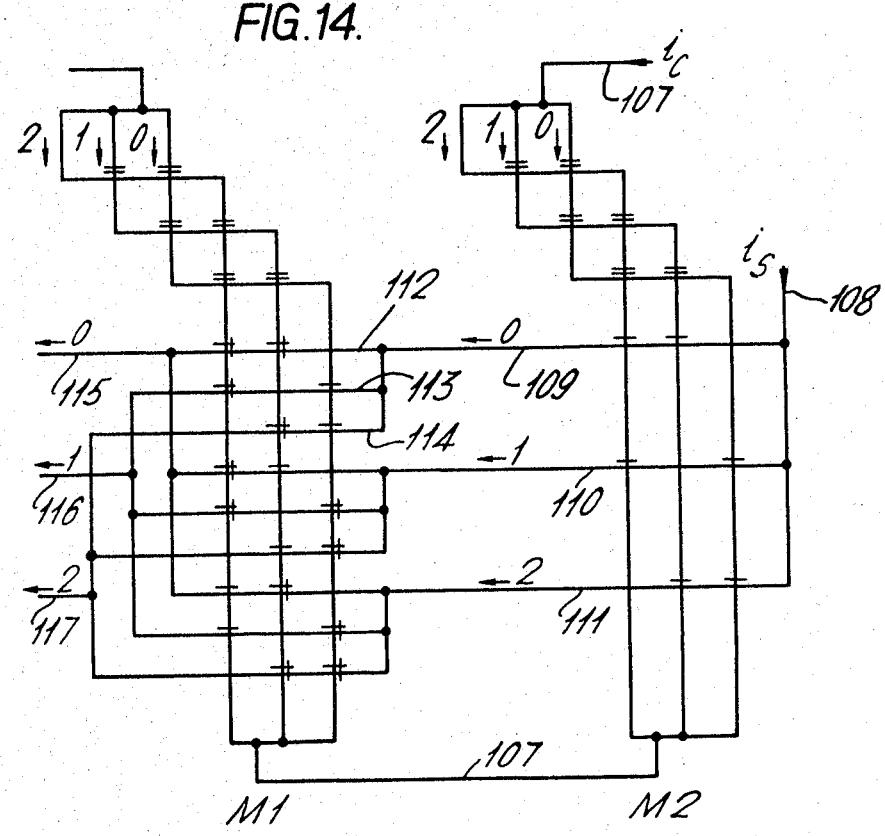

The invention will now be described in detail by means of a variety of illustrative circuits, and with reference to the accompanying drawings, in which:

FIGURES 1A and 1B show the symbolism used herein,
FIGURE 2A shows a basic flip-flop and transfer circuitry,
FIGURE 2B shows various waveforms associated with the basic flip-flop,
FIGURE 3 shows a shift register,
FIGURE 4 shows a binary counter,
FIGURE 5 shows a complementing binary counter,
FIGURE 6 shows a decimal counter,
FIGURE 7 shows a binary parallel adder,
FIGURE 8 shows the application of bridge circuits to form a binary parallel adder-subtractor,
FIGURE 9 shows a simplified flip-flop,
FIGURE 10 shows several waveforms relating to the simplified flip-flop of FIG. 9,
FIGURE 11 shows a wiring layout,
FIGURE 12 shows a supply current reversal control circuit,
FIGURES 13A to 13C show multistable circuits,
FIGURE 14 shows a ternary shift register, and
FIGURE 15 shows a bidirectional shift register.

Symbolism

FIGS. 1A and 1B illustrate the symbolism employed herein, FIG. 1A showing a portion of cryotron circuitry in semi-pictorial form, and FIG. 1B showing the same circuit using the present symbolism. The basis of this symbolism is that a cryotron is represented by two lines crossing each other, with one or more short strokes being drawn parallel to the gate wire. Thus the cryotron 1 (FIG. 1A) is shown in FIG. 1B with its gate wire $1g$ vertical and its control winding $1c$ crossing the gate wire and the associated stroke at right angles. The number of strokes is proportional to the number of turns of the control winding, or more strictly, to the reciprocal of the current required to render the gate wire resistive. Thus cryotron 2, the control winding $2c$ of which is shown in FIG. 1A as having 4½ turns, is symbolized in FIG. 1B by three strokes at the crossing of the gate and control wires, the referent being cryotron 1 with 1½ turns of control winding and one stroke.

Cryotron 3 (FIG. 1A) is shown as having three control windings $3c$, $3c'$, and $3c''$, which produce coincident magnetic fields, so that the net field is proportional to $i+3i'-i''$, where $i$, $i'$, and $i''$ are the currents flowing into the left-hand terminals of the three control windings $3c$, $3c'$, and $3c''$ respectively; the winding $3c''$ is wound in the opposite sense to the windings $3c$ and $3c'$. The symbol for this is shown at 3 in FIG. 1B; the stroke nearest the gate wire is continuous, and crosses the gate wire so that it crosses winding $3c''$ on the opposite side of the gate wire to windings $3c$ and $3c'$.

In this specification the arrangement of two conductors each gating the other, as shown by the two cryotrons at 4 (FIG. 1A), will often be used. The condensed symbol 4 (FIG. 1B) will be used for this.

Basic flip-flop

A basic flip-flop of this invention is shown in FIG. 2A, and its operation will be described with reference to the waveforms of FIG. 2B.

The flip-flop consists of two paths 5 and 6 connected in parallel in a supply line 7. Paths 5 and 6 gate each other by cryotrons 8 and 9, so that if a sufficiently large current flows in the supply line 7, either one of paths 5 and 6 but not both will be conducting, as is well known. In this specification the convention will be adhered to generally, though not rigidly, that flip-flops are shown as rectangles with the longer sides vertical and with small triangles at a pair of opposite corners; and that the "0" and the "1" states have current flowing in the right-hand and left-hand sides of the rectangle, respectively.

As shown in FIG. 2B, the current $i_c$ applied on the supply line 7 is of alternating polarity. It will be realized that the waveform shown is only illustrative, and a sine wave may in practice be conveniently used. Assume that the flip-flop is in the "1" state in clock period T0, so that the current $i_5$ in the path 5 is equal to $i_c$ and the current $i_6$ in path 6 is zero. At time $t_0$ the supply current $i_c$ begins to fall, and $i_5$ falls with it. At time $t_1$ the current $i_5$ falls below the critical value $i_a$ at which cryotron 9 is just controlled. Path 6 therefore becomes conductive at time $t_1$, and any further change in $i_c$ affects $i_5$ and $i_6$ equally. Consequently, $i_5$ falls more slowly towards zero, and $i_6$ builds up negatively. At time $t_2$, the current $i_6$ reaches the critical level $i_a$ at which cryotron 8 becomes effective. Since the two paths 5 and 6 are substantially symmetrical, $i_5$ will be approximately zero at this time, and $i_6$ will be approximately equal to $i_c$. The current $i_6$ will now follow $i_c$, $i_5$ being held at zero by the cryotron 8. At time $t_3$, $i_c$ becomes constant.

It is thus evident that, as a result of the change of polarity of the supply current $i_c$ between clock periods T0 and T1, the state of the flip-flop has been changed from "1" to "0." The change from "0" to "1" between clock periods T1 and T2 takes place in exactly the same manner, and it is clear that the same reversal of state would occur if the flip-flop were in state "0" when $i_c$ was positive.

A transfer circuit 10, here acting as an inhibit circuit, is linked to the flip-flop. This transfer circuit is split into two paths 11 and 12; path 11 both gates and is gated by path 6 of the flip-flop, and path 12 similarly gates and is gated by path 5 of the flip-flop. Suppose that a current $i_s$ is applied on path 10 during clock period T2, as shown in FIG. 2B, and is maintained during the reversal of $i_c$ between clock periods T2 and T3. In clock period T2, paths 6 and 12 will be held non-conducting by the current in path 5, and the transfer current $i_s$ will therefore flow through path 11. This current also holds path 6 non-conducting. When the supply current $i_c$ starts to reverse, the current $i_5$ will at some time $t_6$ fall below the critical value $i_b$ required to hold path 12 non-conducting. Since, however, $i_s$ remains steady and path 11 remains conducting, $i_s$ will continue to flow through path 11. Path 6 of the flip-flop therefore remains non-conducting and the current $i_6$ through it remains at zero. Current $i_5$ therefore follows $i_c$ and path 5 remains conducting in clock period T3. Thus the current $i_s$ has inhibited the change of state of the flip-flop. Obviously the flip-flop can be held in either state by the current $i_s$.

It will be realized that the $i_c$ and $i_s$ circuits must be constructed with little or no magnetic coupling between them, so that the change of $i_c$ does not induce any significant circulatory current in the loop formed by the paths 11 and 12.

The flip-flop is provided with output lines 13 and 14. These output lines may form part of a transfer circuit which controls other flip-flops, and the transfer circuit 10 of the flip-flop shown will itself be controlled from other flip-flops, all flip-flops being fed with the same supply current. The cryotrons 8 and 9 which "lock" the flip-flop into one or other of its two states are arranged to have a critical current $i_a$ smaller than the critical current $i_b$ required to control the output lines 13 and 14. During each reversal of the supply current, therefore, all cryotrons in the transfer circuits will cease to be effective before the cryotrons "locking" the flip-flops (e.g. cryotrons 8 and 9) become ineffective. Since there is no resistance introduced into the transfer circuits, however, the current distribution therein will be unaffected by this, and the reversal or inhibition of reversal of state of the various flip-flops will occur as if the cryotrons controlling the transfer circuits were still effective. The flip-flop cryotrons will eventually become effective and "lock" the flip-flops into their new states. It is only after this "locking" has occurred that the supply currents to the flip-flops increase to the value at which the transfer circuit cryotrons can become effective to cause any change in the transfer circuit currents. Consequently it is impossible for the change of state of any of the flip-flops to affect the setting of any other flip-flop during the same reversal of supply current.

This is illustrated by the waveforms of FIG. 2B. Between clock periods T1 and T2, the flip-flop of FIG. 2A changes state from "0" to "1." At time $t_4$ cryotron 9 cuts off path 6, and at a later time $t_5$ the current $i_s$ is cut on by a similar flip-flop controlling output lines, similar to lines 13 and 14, which feed the transfer circuit 10. The delay between $t_4$ and the time at which the current $i_s$ becomes effective is further increased in practice by the finite rise time of $i_s$, indicated by dotted curve in FIG. 2B. During the next reversal of $i_c$, between clock periods T2 and T3 the current $i_s$ will become uncontrolled at time $t_6$, but will not change until time $t_8$, after the time $t_7$ at which the flip-flops are "locked" to their new states.

The cryotrons in paths 11 and 12 are constructed to have the same critical current level as those in paths 13 and 14, since paths 11 and 12 may form part of the inputs to the transfer circuits of other flip-flops.

*Shift register*

FIG. 3 illustrates the four right-hand end stages P1 to P4 of a shift register adapted to shift information to the left. The flip-flops are all connected serially together, and the alternating clock current $i_c$ is applied to them as shown. The transfer circuit is energized with a steady direct current $i_0$ on line 15.

The first stage P1 is set by some means not shown. Transfer current from line 15 flows through path 16 or path 17 according as P1 stores "0" or "1." Suppose that P1 is storing "0." The transfer current will flow along path 16, and then along path 18 or 19 according as P2 is storing "0" or "1." If P2 is storing "0," its switching must be inhibited at the next reversal of $i_c$, and path 18 therefore gates the left-hand path 20 of flip-flop P2; if, on the other hand, P2 is storing "1," its switching must be allowed, and path 19 therefore does not gate the right-hand path 21 of P2. It can also be seen that if P1 stores a "1," then P2 must switch if it stores a "0" but not if it stores a "1"; hence path 22 is gated by but does not gate path 20, and path 23 is gated by and gates path 21.

Flip-flop P2 has four transfer circuit outputs, paths 18, 19, 22, and 23, corresponding to the four possible states of flip-flops P1 and P2 taken together. However, only the two states of P2 are of significance for the next stage P3, and paths 18 and 22 are therefore connected together to form the transfer "0" input to P3, and paths 19 and 23 are similarly connected together as the transfer "1" input to P3. These two inputs to P3 are exactly analogous to the input lines 16 and 17 to P2.

Each stage after P3 is constructed in exactly the same manner, the four transfer output lines from the last stage being connected together and returned to the transfer current source. It should be noted that there will be just one conductive path through the transfer circuit. This is due to the fact that each input to a flip-flop has two branches through the flip-flop, the two branches being gated by the two paths of the flip-flop. Hence at each junction, only one of the two paths is conductive. This also means that current cannot flow "backwards" where two outputs are joined (e.g. current cannot flow from path 22 back into path 18), for such a "backward" path can never have a second reversal to the "forward" direction. This property of the transfer circuitry does not depend on the particular circuit to which the invention is applied.

It should be clear that when the clock current $i_c$ reverses, each flip-flop in the shift register will either change its state or be inhibited from so doing by the transfer current, and that the transfer current will be disturbed and start to flow along its new path only after the flip-flops have assumed their new states, the state of each being the same as the last state of the preceding flip-flop. Thus the entire pattern is shifted one stage to the left at each reversal of the supply current $i_c$.

Binary counter

FIG. 4 shows the first four stages Q1, Q2, Q4, and Q8 of a binary counter. The rule utilized here is: to increase a binary number by one, change each digit in turn, starting at the right-hand end of the number, up to and including the first zero, and leave all remaining digits unchanged. The count of this counter is therefore increased by one at each reversal of $i_c$.

The transfer current is applied on line 24. The transfer circuitry is in the form of a ladder, with a lower rail 25, a double upper rail 26, and cross rungs 27, 28, 29, and 30. The transfer current flows along the lower rail 25 across the flip-flops as long as "1"s are stored, but at the first "0" the current flows through the corresponding rung and along the upper rail 26 thereafter. Thus, if flip-flops Q1, Q2, Q4, and Q8 are storing 1, 1, 0, and 1 respectively, the transfer current will flow along the lower rail across flip-flops Q1 and Q2, through rung 29, and through branch 31 of the upper rail 26 across flip-flop Q8. It is clear that at the reversal of $i_c$, those flip-flops up to and including the one at which the transfer current flows through the rung will change their states, and all other flip-flops will be inhibited from changing, thus putting into effect the above rule and increasing the count of the counter by one.

It is clear that no rung across the final stage is necessary, and the lower rail will then not be gated by the final stage. The upper and lower rails will be connected together at the output from the final stage, and returned to the transfer current source.

Complementing binary counter

In FIG. 5 the first four stages R1, R2, R4, and R8 of an alternative form of binary counter are shown. This counter operates by forming, at each step, either the "ones" or the "twos" complement of the number stored. With $n$ stages, the "ones" and "twos" complements are the complements modulo $2^n-1$ and modulo $2^n$ respectively. The "ones" or "twos" complement is formed according as the transfer current is or is not present on line 32 at the time of reversal of the supply current $i_c$. The count of this counter can therefore progress along any of the arrowed routes in the following table (in which 1 and 2 indicate "ones" and "twos" complements respectively):

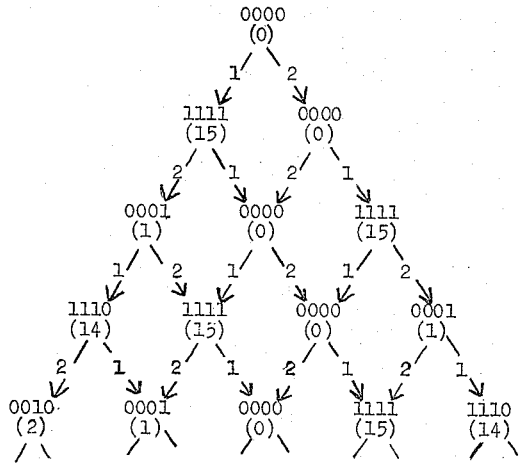

It is seen that, if the count is utilized only in alternate clock periods, it is possible to count either up or down.

In construction, the counter resembles a simplified version of FIG. 4. The "ones" complement is trivially mechanized by applying no transfer currents. The "twos" complement is mechanized by using the following rule: starting at the right-hand end of the number, leave all digits up to and including the first "1" unchanged, and change all succeeding digits. This is achieved by providing a lower rail 33 along which current flows until a "1" is reached and which inhibits switching of the flip-flops over which such current flows, a cross rung (34 to 37) for each flip-flop, conductive when a "1" is stored and inhibiting switching and an upper rail 38, acting merely as a current return path.

The means for controlling the application of a transfer current to line 32 are trivial and are not shown. It is evident that if the transfer current is supplied at an intermediate point on the lower rail 33 instead of on line 32, a power of two will be added or subtracted. Thus a current introduced at point 39 will increase or decrease the count by four.

Decimal counter

FIG. 6 shows one complete stage of a binary-coded-decimal counter. The stage comprises four flip-flops U1, U2, U4, and U8 having weights of 1, 2, 4, and 8 respectively. The transfer circuit comprises generally upper and lower rails 40 and 41 with a rung structure between them and a circuit for resetting the stage from "9" to "0."

Transfer current will enter the first stage on the lower rail 41. The current first enters a circuit which determines whether or not a "9" is stored by the stage. This circuit has two output lines 42 and 43, line 42 being energized only if a "9" is stored. More precisely, current flows from the lower rail 41 to the line 42 if flip-flops U1 and U8 are both storing "1," this state being reached only at the count of "9." Line 42, if energized, must reset the stage to the count "0": since flip-flops U1, U2, U4 and U8 are in the states "1," "0," "0," and "1" respectively at the count "9," line 42 inhibits switching of flip-flops U2 and U4 as shown. Line 42 is continued as the lower rail to the next stage, current flowing in this lower rail if a carry is to be propagated. If the number stored is not "9," the input current on line 41 will flow through line 43. The transfer circuitry between line 43 and the upper rail 40 is substantially identical with the binary counter shown in FIG. 4, and a current on line 43 will increase the count of the stage by one.

The output to the next stage will be either on the left-hand end of line 40, if there is no carry, or on line 42, if there is a carry.

Parallel binary adder

FIG. 7 shows two stages of a parallel binary adder. Flip-flops B2 and B3 form part of a B register used to store the addend, and flip-flops A2 and A3 form part of an A register used to store both the augend and the sum. The A and B register flip-flops are shown connected in two different supply lines with supply currents $i_A$ and $i_B$ respectively, since it is not necessary to switch the B register flip-flops during addition, and the B register may be supplied with direct current at least during addition.

The transfer input to each stage of the adder consists of two lines, representing carry "0" and carry "1" respectively. Thus, line 46 is energized for a "0" carried, and line 47 is energized for a "1" carried. These lines first cross flip-flop B2, and three output lines 48, 49 and 50 are provided from this flip-flop, representing partial sums of 0, 1, and 2 respectively. The partial sum of the carry and the B2 flip-flop is then fed to flip-flop A2, to set this flip-flop to the sum bit, and the outputs from flip-flop A2 are combined to form the next carry bit. Thus lines 48 and 50 both inhibit A2 from switching, since the sum bit is that already in A2 when the partial sum is 0 or 2, and line 49 allows A2 to switch, since with a partial sum of 1 the final sum bit is the opposite of the bit in A2. Lines 48 and 50 lead to carry "0" and carry "1" lines 51 and 52 respectively, and line 49 leads to line 51 or 52 according as A2 stores "0" or "1." The two lines 51 and 52 form the carry input to the next stage, flip-flops A3 and B3, in exactly the same manner as lines 46 and 47 form the input to flip-flops A2 and B2.

Bridge circuits

It will be realized that it will often be desirable to hold the supply current to some group of flip-flops steady for several clock periods instead of reversing it at the end of each clock period. This reduces the quantity of transfer circuitry required, since a single supply current control unit will be equivalent to an inhibit transfer circuit (of the type shown in FIG. 2A) on every flip-flop of the group. One method of controlling the reversals of supply current is to use a bridge circuit, which may have either alternating or direct current supplied to it. The bridge is controlled by a flip-flop which will itself be controlled by transfer circuits in the normal manner.

FIG. 8 shows two bridge circuits arranged so as to permit the adder of FIG. 7 to be used also for subtraction. Considering first the flip-flop X, the transfer circuit input 53 thereto is normally energized, and it will be assumed herein that flip-flop X normally has path 54 conductive and path 55 cut off. Two bridge circuits 56 and 57 are controlled by flip-flop X. Bridge circuit 56 has a steady direct current $i_{D.C.}$ supplied between the two corners 58 and 59, and the B register flip-flops are supplied by the output current $i_B$, being connected between corners 60 and 61. Bridge circuit 57 has the alternating current $i_C$ applied between corners 62 and 63, and has the A register flip-flops connected across corners 64 and 65, the output current being $i_A$. Since the X flip-flop is normally held in the state with path 54 conductive, the A register supply current $i_A$. Since the X flip-flop is normally held in the state with path 54 conductive, the A register supply current $i_A$ will normally be alternating and the B register supply current $i_B$ will normally be unidirectional.

The transfer circuit input to the adder passes first through the X flip-flop; the adder transfer current flows from line 66 through either line 67 or line 68, which are formally equivalent to carry "0" and carry "1" lines respectively to the first stage, flip-flops A0 and B0 of the adder.

For addition, the A and B registers are assumed to be loaded with the augend and addend, and the transfer circuit input lines 53 and 66 energized. At the reversal of $i_c$, flip-flop X remains in the same state (path 54 conducting), the supply current $i_A$ to the A register reverses and thus effects the addition of the addend to the augend, and the supply current $i_B$ to the B register remains steady.

For subtraction, the A and B registers are loaded with the diminuend and subtrahend respectively. Line 53 is not energized during the first clock period, and consequently at the first reversal of $i_c$ flip-flop X will change its state. The two bridge circuits 56 and 57 will each change over; thus the current $i_A$ to the A flip-flops will not reverse, and the current $i_B$ to the B flip-flops will reverse. The A flip-flops will therefore remain unchanged and the B flip-flops will all change their states, so that the B register will hold the "ones" complement of the subtrahend. It is immaterial whether line 66 is energized or not during this reversal of $i_c$.

During the next clock period, lines 53 and 66 are both energized. At the next reversal of $i_c$, therefore, flip-flop X will remain in its abnormal state. The supply current $i_A$ to the A register will reverse and the contents of the B register will be added into the A register. Line 67 will, however, be energized, and an extra "1" will therefore be added in as well. This results in the "twos" complement of the subtrahend being added to the diminuend, the final contents of the A register being the required difference.

It will be realized that there will be a short time interval during the reversal of $i_c$ when the currents in the paths of the flip-flop controlling a bridge circuit are too low to hold the bridge arms cut off. Hence during this interval the output current from the bridge will be uncontrolled, and will in fact tend to remain at its value at the moment when all four arms of the bridge became conductive. This does not matter if the output current is not reversing, but if the output current is to be reversed then this effect will result in the bridge output current reversal lagging slightly behind the basic clock current $i_c$. This will reduce the overall speed of the system, although a partial compensation is possible by using a slightly advanced clock signal for the flip-flops controlling bridge circuits. Such a compensation is also desirable in order to keep all flip-flops as nearly as possible in step.

Simplified flip-flop

The basic flip-flop described above comprises two paths connected in parallel and each gating the other. This flip-flop circuit may, however, be simplified by taking advantage of the fact that a current distribution, once established, tends to remain unaltered. The simplified flip-flop consists merely of two parallel-connected paths, neither of which gates the other. An alternating current supply will periodically reverse the state of this simplified flip-flop, and its switching can be inhibited by transfer circuitry, in substantially the same manner as for the basic flip-flop. There are, however, certain differences between the two circuits which should be noted.

In FIG. 9 there is shown a simplified flip-flop comprising two paths 71 and 72 connected in parallel in a supply line 73 fed with an alternating supply current $i_c$. A transfer circuit 74, when energized, inhibits the switching of the flip-flop. In FIG. 10 there are shown several waveforms illustrating the details of the currents in the flip-flop during the reversal of $i_c$.

The uppermost waveform $i_c$ shows a single reversal of the clock current $i_c$. The next two waveforms $i_{71}$ and $i_{72}$ show the currents in paths 71 and 72, respectively, when no transfer circuit current is present. At time $t_0$, $i_{71}$ starts to decrease towards zero and $i_{72}$ starts to increase negatively, each at a rate half that of the rate of change of the clock current. At time $t_2$, current $i_{71}$ falls below the critical current $i_b$ of the cryotron by which path 71 controls the associated branch of the transfer circuit, at time $t_3$ the current $i_{72}$ reaches the critical current $i_b$ of the cryotron by which path 72 controls the transfer circuit, and at time $t_5$ the clock current $i_c$ reaches its negative steady value. The lower-most waveforms $i_{71'}$ and $i_{72'}$ show the currents in paths 71 and 72, respectively, when the transfer circuit is energized. Path 72 is held resistive and the current $i_{72}$ is therefore zero throughout the reversal of $i_c$. The current $i_{71}$ therefore follows $i_c$, and consequently falls below the critical current $i_b$ at time $t_1$ and reaches $i_b$ again at time $t_4$.

It will be realized from this that, in a complete circuit containing several simplified flip-flops, those flip-flops which do not switch will regain control of their transfer circuits a short time before those flip-flops which do switch. Thus the transfer circuit currents will begin to change to their new values (at time $t_3$) before all flip-flops have finished switching (at time $t_4$). This sets a lower limit on the rate of reversal of the clock current $i_c$; for, to obviate false switching, the time interval between times $t_3$ and $t_4$ must not be long enough for any significant change in the distribution of the transfer currents to occur therein. It may be noted that in fact the currents in the flip-flop legs will lag slightly behind the clock current, as indicated by the broken lines for waveforms $i_{71'}$ and $i_{72'}$, due to the inductances of the circuits, and this interval will therefore be greater than is shown in FIG. 10. The interval will also be increased by the differences between the critical currents of different cryotrons in the circuit, these differences being due to small temperature, material, and dimensional differences.

It will be seen, from FIG. 10, that time $t_4$ lies, ideally, midway between times $t_3$ and $t_5$; and similarly, time $t_1$ lies midway between times $t_0$ and $t_2$. Hence, if the interval between times $t_3$ and $t_4$ is to be minimized, the interval between times $t_0$ and $t_1$, and between times $t_4$ and $t_5$, must also be minimized. This means that the peak value of the clock current $i_c$ must be as close as possible to the critical current $i_b$ of the cryotrons controlling the transfer circuits. The interval between successive reversals of the clock current must, however, be long enough to allow the transfer currents to become redistributed. Hence the clock current $i_c$ preferably has a waveform with fairly rapid reversals and flat portions between the reversals.

The simplified flip-flop is more easily disturbed than the basic flip-flop. The transfer circuit current should therefore not be so great that, when it is being switched from one path to another, both paths simultaneously carry enough current to operate cryotrons therein. This condition also applies, of course, to the basic flip-flop; it is not mandatory in either case, but the extent to which it may be broken is much greater in the basic flip-flop than in the simplified flip-flop.

It will be noted that each time the switching of a simplified flip-flop is inhibited, one branch thereof is held resistive and the current in that branch is consequently zero. If the flip-flop is allowed to switch, then the current in the nominally non-conducting path thereof will actually be half the difference between the positive and negative peaks of the clock current; and if the flip-flop is allowed to switch freely for a long sequence of reversals of the clock current, the current in the nominally non-conducting path will, at each clock period, be half the difference between the peak clock current at the beginning of the sequence and the peak current during that clock period. Thus there will not be any cumulative build-up of circulating current in the flip-flop. Care must, however, be taken to ensure that the magnetic coupling between each flip-flop and the rest of the circuit is small.

*Circuit layout*

FIG. 11 illustrates a physical arrangement of the basic flip-flop circuit suitable for use when thin-film deposited circuitry is being employed. Just over one full stage of the shift register of FIG. 3 is shown. The flip-flop comprises two paths 75 and 76 connected in parallel in the supply line 77, and the transfer circuitry is indicated generally at 78. It will be seen that each of the paths 75 and 76 is doubled back on itself; this permits these paths to both gate and be gated by a branch of the transfer circuit, as is shown by the uppermost branch 79 of the transfer circuit which both gates and is gated by path 76. The doubled back form of the paths 75 and 76 also minimizes their inductance. The total inductance of the chain of flip-flops may also be reduced by placing the return line 80 close to the supply line 77, as shown.

This arrangement of circuitry may clearly be employed for all circuits using either basic or simplified flip-flops, the two doubled-back paths of each flip-flop being extended sufficiently to encompass the transfer circuitry.

*Supply current control*

A bridge circuit for controlling the reversals of the supply current has been described above. The circuit of FIG. 12 provides an alternative and improved method of controlling such supply current reversals.

The principle of the circuit is that either of two current sources, one A.C. and one D.C., may be selected during each clock period as the source of the output supply current for the remainder of the clock period and the switching time between the current and next succeeding clock periods. It is necessary to provide a bridge circuit for each of the two current sources, to enable them to be effectively reversed, and a flip-flop for each bridge circuit, the flip-flops controlling the bridge circuits.

The two output lines 81 are connected either to points 82 and 83, if line 84 is energized and line 85 is not energized, or to points 86 and 87, if line 84 is not energized and line 85 is energized. Points 82 and 83 are connected through a reversing bridge to an alternating clock current source 88, the bridge being controlled by lines 89 and 90 which are in turn controlled by a flip-flop L1. Points 86 and 87 are similarly connected through a second reversing bridge, controlled by lines 91 and 92, to a direct current source 93, lines 91 and 92 being controlled by a flip-flop L2. The input lines 84 and 85 inhibit the switching of flip-flops L1 and L2 respectively, these flip-flops being supplied by the alternating clock current $i_c$.

The two input lines 84 and 85 form part of a single transfer circuit. One and only one of these lines will therefore be energized, and during the reversal of $i_c$, their states will not change. The two pairs of lines 89 and 90, 91 and 92, which are supplied with direct current as shown, effectively form transfer circuits controlled by flip-flops L1 and L2 respectively, and one line of each pair will therefore be energized steadily during the reversal of $i_c$. Consequently, during the reversal of $i_c$ the output lines 81 will remain undisturbedly connected to one or the other of the two current sources 88 and 93, depending on whether line 84 or 85 is energized. The current source not connected to the output lines 81 is, of course, shorted out by one of the two lines between points 82 and 83, and 86 and 87.

After the reversal of $i_c$ is completed, the transfer current on lines 84 and 85 will either remain unchanged or change from one of these lines to the other. Assuming that the transfer current does so change from, say, line 85 to line 84, the current on line 85 will begin to fall from its steady maximum value towards zero soon after the beginning of the new clock period. At some time during this fall the current source 93 will have the short-circuit line between points 86 and 87 connected across it, and the current source 88 will have the output lines 81 connected across it in parallel to the short-circuit line between points 82 and 83. The current distribution will not, however, be changed.

At the same time as the current in line 85 is falling, the current in line 84 is rising. The critical currents of the cryotrons are so arranged that the cryotrons controlled by line 84 do not become effective until after the cryotrons controlled by line 85 have become ineffective. At some time after the two lines joining point 86 to points 83 and 87 have become conductive, therefore, the two lines joining point 82 to points 83 and 87 will become resistive. Assuming that the currents are of the right polarities, the current on the output lines 81 will be substantially unaffected (the output load inductance being relatively large) while the currents on the lines joining point 82 to points 83 and 87 are destroyed and currents are established on the lines joining point 86 to points 83 and 87. Thus, the change of input current between lines 85 and 84 changes the source of output current on lines 81 between sources 88 and 93. This change-over is accomplished during the clock period while the clock current $i_c$ is steady, and is completed before the clock current begins to reverse. At the end of the clock period, therefore, the output current either remains steady, if supplied from source 93, or reverses in exact synchronism with the reversal of $i_c$, if supplied from source 88.

It will be seen that at the beginning of each clock period, the points 83 and 86 must be of the same polarity with respect to points 82 and 87 respectively, so that if the input current changes, the output current will remain of the same polarity while sources 88 and 93 effectively interchange roles. During the reversal of $i_c$, source 88 changes polarity with respect to source 93; one or the other of the two reversing bridges must therefore change so as to maintain the points 83 and 86 of the same relative polarity. Obviously, the bridge that reverses must be the one not at that time connected to the output lines. Thus, if line 84 is energized during the reversal of $i_c$, source 88 is connected to the output lines 81, and the bridge between source 93 and points 86 and 87 is the one that must be reversed. The two bridges connected to sources 88 and 93 are controlled by respective flip-flops L1 and L2, and the switching of these two flip-flops is inhibited by lines 84 and 85 respectively. The bridge that is reversed is therefore the one not connected to the output lines 81. It is immaterial whether the alternating current source 88 is effectively rectified while the direct current source 93 supplies the output lines 81, or whether the direct current source 93 is effectively reversed while the alternating current source 88 supplies the output lines 81. Provided that the initial polarities of points 83 and 86 are the same, they will remain of the same relative polarity thereafter. It is clearly necessary to provide some means, not shown, for ensuring that the initial states of flip-flops L1 and L2 are correct.

When the output lines are connected to the alternating current source 88, it is necessary that the bridge circuit between source 88 and the output lines be controlled throughout the reversal of $i_c$, to avoid any alternative path becoming available through which the changing clock current might flow. Flip-flop L1 cannot be used for such control directly, since, when its switching is inhibited, the current in the conductive branch passes through zero. The lines 89 and 90 are therefore provided to ensure that there is only one conductive path across source 88 when the clock current therefrom reverses. Flip-flop L2 is similarly shown as controlling the bridge between source 93 and the output lines 81 indirectly, via lines 91 and 92; it will be realized, however, that this bridge could be controlled directly by flip-flop L2, since the current from source 93 does not vary and the current distribution will therefore remain unaffected by any additional conductive paths introduced across this source.

*Multistable circuits*

Multistable circuits of the type having several paths connected in parallel across a single alternating supply current source, each gating all the others, will now be described. It will be seen that, if correct operation is to be achieved, it is essential to provide transfer circuitry.

FIGURE 13A shows a multistable circuit comprising four paths 94 to 97. The circuit may be said to hold a count of 0, 1, 2, or 3 according as path 94, 95, 96 or 97 is conductive, the conductive path holding all the others cut off. The four paths are connected in parallel in an alternating clock current supply line 98, and a "count" transfer circuit 99 is provided. The transfer current $i_s$ therethrough flows through path 100, 101, 102 or 103 according as the multistable circuit holds 0, 1, 2, or 3; each of the paths 100 to 103 of the transfer circuit, when energized, holds all the paths of the multistable circuit cut off except the two paths corresponding to the count held and the next count up (counting cyclically). On the reversal of the clock current $i_c$, therefore, the count of the multistable circuit will be increased by one, the paths corresponding to counts other than the current and next counts being held cut off by the transfer circuit.

Other types of change between counts may obviously be implemented in exactly the same way, the only exception being the "stick" circuitry. This is illustrated in FIGURE 13B, and it is seen that the "stick" transfer circuit 99' comprises four paths 100' to 103', corresponding to the four paths 94' to 97' of the multistable circuit respectively, and that each of the transfer circuit paths both gates and is gated by all but the associated one of the multistable circuit paths. Thus, when the "stick" transfer circuit is energized, all but one of the paths of the multistable circuit are held cut off.

It will be realized that the complete transfer circuit may consist of several sections giving, e.g., "count" or "stick" for some counts and "jump" for others, dependent on other circuitry controlling the several sections. However, the arrangement must be such that one and only one of the paths of the transfer circuit is conductive, so that all but one (for "stick") or two (for "count" or "jump") of the paths of the multistable circuit are cut off thereby.

A simplification of the transfer circuitry for counting can be achieved by arranging for some of the multistable circuit cryotrons to have a different critical current from the others. As shown in FIGURE 13C, the cryotrons by which adjacent paths of the multistable circuit gate each other have a critical current less than half that of the other cryotrons. The "count" transfer circuit will contain $m$ paths, related to the number of paths $n$ of the multistable circuit thus:

$n$: 3 4 5 6 7 8 9 10 11 12 . . .
$m$: 3 4 5 3 4 4 3 4 4 3 . . .

$n=5$ being exceptional.

In FIG. 13C, the transfer circuit has path 104, 105, or 106 conductive as the count of the multistable circuit is 0 or 3, 1 or 4, or 2 or 5. For each count, the corresponding transfer circuit path has only to hold cut off those two paths of the multistable circuit with counts one less than and two more than the current count; all other paths are held cut off by currents in the paths corresponding to the current or next counts. Thus the same path of the transfer circuit can be used for counting from several different counts, provided that the counts all differ by more than two. If $n$ is divisible by 3, then the counts can be divided into three groups containing counts giving remainders of 0, 1, and 2 respectively on division by 3. If $n$ is not divisible by 3, an extra group will be required, one or two of the groups having one pair of adjacent counts differing by 4. If $n=5$, then five groups will be required; this is because counting is cyclic, and no two counts can therefore differ by more than two. Of course, normal "stick" and "jump" transfer circuits may also be provided, the particular transfer circuit energized being determined by other circuitry.

*Simplified multistable circuits*

It will be recognized that multistable circuits may be simplified in a manner similar to the manner in which the flip-flop of FIG. 2A was simplified to yield the flip-flop of FIG. 9, i.e. by omitting the cryotrons by which the paths of this multistable circuit gate each other. If this is done, then it is necessary to ensure that at most two paths of the circuit are conductive during reversal of the supply current. Thus the techniques of FIGS. 13A and 13B, but not of FIG. 13C, may be used with such simplified multistable circuits. Tolerances will be reduced in such simplified multistable circuitry, for reasons similar to those set out in the section on the simplified flip-flop.

*Ternary shift register*

FIG. 14 shows the construction of a ternary shift register, the first two stages M1 and M2 being shown. Each of the stages consists of three paths, each both gating and being gated by the other two paths and representing one of the three possible states or counts of "0," "1," and "2." The convention used here is that when a stage is in a given count, current flows in those lines of that stage labelled with that count. The stages M1 and M2 are serially connected in the supply line 107 to which the clock current $i_c$ is applied, and transfer current $i_s$ is applied to the transfer circuitry via line 108.

Line 108 feeds three lines 109 to 111 which are used for shifting the counts of "0," "1," and "2" respectively from stage M1 to stage M2. Thus line 109 is gated by paths "1" and "2" of stage M1, line 110 by paths "0" and "2," and line 111 by paths "0" and "1" of that stage. The input lines to stage M1 are not shown.

Line 109, the transfer "0" line, feeds three lines 112 to 114 crossing stage M2. These three paths correspond to the three possible states of stage M2; in general, each input line to an $n$-stable circuit will feed $n$ paths crossing that circuit. (Exceptions may occur if the input is not completely independent of the state of the circuit; thus if, for example, in the present case, it is known that when stage M1 contains "0," stage M2 contains either "0" or "1," then only two input lines 112 and 113 will be required for line 109.) Line 112, 113, or 114 will be energized according as stage M2 stores "0," "1," or "2"; these lines are therefore gated by stage M2 just as lines 109 to 111 are gated by stage M1. In order to transfer the count of M1 to M2, these lines 112 to 114 must also gate stage M2 appropriately. Thus line 112 has current flowing therethrough when M2 stores "0" and must therefore "stick" in the same state, and this line therefore gates paths "1" and "2" of M2. Line 113 is energized when M2 stores "1," and therefore gates path "2" of M2. Line 114 is energized when M2 stores a "2," and therefore gates path "1" of M2.

In a similar manner, the three lines which each of lines 110 and 111 feeds will gate and be gated by the appropriate paths of M2.

This gives a total of nine output lines from stage M2. There are, however, only three conditions which must be distinguished in the output from M2, viz. the count of "0," "1," or "2" stored in M2. The output lines from M2 are therefore connected together in three groups corresponding to these three conditions. The three final output lines from M2, lines 115 to 117, correspond to the output lines 109 to 111 respectively from M1. Further stages of the shift register are therefore identical with stage M2.

*Bidirectional shift register*

In FIG. 15 there are shown the two left-hand end stages, N1 and N2, of a bidirectional shift register, with transfer circuitry passing across them, and a direction flip-flop Z. The transfer circuit current and the peak value of the clock current $i_c$ are assumed to be equal and somewhat less than the critical current of a cryotron represented by a single stroke.

The transfer circuit comprises generally upper and lower rails 118 and 119 and a pair of cross-bars across each stage of the register. Upper rail 118 both gates and is gated by the "0" path of each flip-flop, and lower rail 119 both gates and is gated by the "1" path of each flip-flop. The cryotrons used for this are operated by the transfer or clock current. The cross-bars 120 and 121 across stage N2 are gated by both the "0" and the "1" paths of that stage by cryotrons which will operate only when an additional, bias, current is present also. A pair of bias lines 122 and 123 are provided, bias line 122, when energized, permitting cross-bars 120 and 121 to be gated by the "0" and "1" paths, respectively, of the flip-flop N2, and bias line 123, when energized, permitting cross-bars 120 and 121 to be gated by the "1" and "0" paths, respectively of the flip-flop N2. By comparison with the unidirectional shift register described with reference to FIG. 3, it can be seen that the circuit of FIG. 15 is effectively identical with a rightward or leftward shifting register according as bias line 122 or 123 is energized; these bias lines are also indicated by the letters R and L respectively, the register being a rightward or leftward shift register according as bias line R or L, respectively, is energized.

The current $i_c$ which operates the cryotrons by which the flip-flops gate the corresponding cross-bars of the transfer circuitry is, of course, alternating. The bias current in lines 122 or 123 must therefore also be alternating, and this is conveniently achieved by connecting the bias lines in series with the supply line to the shift register flip-flops, as shown.

The direction of shift is determined by means of a flip-flop Z which gates the supply current $i_c$ into one or the other of the two bias lines 122 and 123. This flip-flop may be operated from a different supply current, and is shown only conventionally.

It will be realized that the principle of selecting one of several groups of cryotrons by means of bias lines may be used quite generally, the advantage being that less transfer circuitry is required and the disadvantage being that many of the cryotrons require two control windings. The technique may therefore be not easily applicable to thin film circuitry.

*Concluding remarks*

The circuits described above have been concerned with operations of a generally arithmetical nature. It will be realized, of course, that the invention is equally applicable to circuits which perform operations of a more purely logical nature, such as the operations occurring in the control circuits of a computer. It will also be realized that a single set of flip-flops or multistable circuits may be used for a variety of functions by providing several different sets of transfer circuits and energizing the one corresponding to the desired function; the addition of a shift transfer circuit of the FIG. 3 type to the adder of FIG. 7 or the adder-subtractor of FIGS. 7 and 8, for example, will enable multiplication to be performed.

What I claim is:

1. Superconductive circuitry including a logical circuit having at least two stable states and a superconductive branch corresponding to each state coupled so that a current in one branch has a cooperative relation with respect to current in another branch, and means for simultaneously applying a reversible current to a plurality of branches of said logical circuit, the construction and arrangement of the branches of said logical circuit being chosen with respect to said reversible current so that the state of said logical circuit is changeable in response to the reversing of said current.

2. Superconductive circuitry including a logical circuit having at least two stable states and a superconductive branch corresponding to each state coupled so that a current in one branch has a cooperative relation with respect to current in another branch, means for simultaneously applying a reversible current to a plurality of branches of said logical circuit, transfer circuit means controlling the superconductivity of the branches of said logical circuit, and means for applying current to said transfer circuit means, the construction and arrangement of said logical circuit and said transfer means being chosen in conjunction with said reversible current so that the state of said logical circuit is changeable in response to the reversing of said current dependent upon the flow of current in said transfer means.

3. A superconductive flip-flop comprising two paths connected in parallel with respect to a supply line, said paths gating each other, means for providing a supply current in said supply line, means for causing said supply current to flow through one of said paths, the particular path in which supply current flows being representative of the state of said flip-flop, and means for reversing said supply current so as to change the state of the flip-flop.

4. A circuit according to claim 3, including a transfer circuit gating at least one of said paths, and means for energizing said transfer circuit during the reversal of the supply current so that the path not carrying supply current is prevented from receiving supply current and the reversal of state of the flip-flop is inhibited.

5. A circuit according to claim 4, wherein the transfer circuit comprises two branches connected in parallel, at least one of the transfer circuit branches being gated by a respective path of the flip-flop.

6. A circuit according to claim 5, wherein both branches of the transfer circuit are gated by respective paths of said flip-flop.

7. A circuit according to claim 6, wherein a first critical current is required to permit the paths of said flip-flop to gate each other, and a second critical current, greater than said first critical current is required for the branches of the transfer circuit to be gated by the flip-flop.

8. A superconductive multistable circuit comprising at least three paths, each path being capable of becoming either superconductive or resistive, a source of supply current, means connecting said paths in parallel with respect to said supply current, means for causing the supply current to flow through any selected one of said paths, means for reversing the supply current, and transfer circuit means for maintaining all but one of the unselected paths resistive during the reversal of the supply current.

9. A circuit according to claim 8, wherein each of said paths gates all the other paths.

10. A circuit according to claim 8, wherein said transfer circuit means comprise a plurality of transfer circuits each of which is adapted when energized to maintain a different combination of said paths resistive, and including means for energizing any selected one of said transfer circuits.

11. A circuit according to claim 10, wherein one of said transfer circuits maintains all the unselected paths resistive.

12. A circuit according to claim 10, wherein each transfer circuit comprises a plurality of branches connected in parallel and gated by said paths so that while said supply current is steady a single conductive path exists through each transfer circuit.

13. A circuit according to claim 9, wherein a first critical current is required for the paths of the multistable circuit to gate each other and a second critical current greater than said first critical current is required for the paths of the multistable circuit to gate the branches of the transfer circuits.

14. A superconductive circuit including a source of alternating current which reverses polarity at regular intervals, logical circuits to which said alternating current is connected, and inhibiting means for effectively inhibiting any selected reversal of said current, said inhibiting means comprising a four-branch bridge circuit having said source of alternating current connected to one pair of opposite corners and an output taken across the other pair of opposite corners, and a flip-flop having two paths respectively gating the two pairs of opposite branches of said bridge circuit.

15. A circuit according to claim 14, and including a second bridge circuit similarly controlled by said flip-flop and having a direct current source connected to one pair of opposite corners and an output taken across the other pair of opposite corners.

16. A circuit according to claim 14, wherein said flip-flop comprises two paths connected in parallel, energizable transfer means for gating at least one of said paths, and means for applying a reversible supply current to said paths, the reversals of said supply current being simultaneous with the reversals of said source of alternating current of said bridge circuit.

17. A superconductive circuit including a source of alternating current which reverses polarity at regular intervals, logical circuits to which said alternating current is connected, inhibiting means for effectively inhibiting any selected reversal of said current, and a source of direct current connected to said logical circuits, said inhibiting means comprising selecting means for selectively applying current from either the source of alternating current or the source of direct current to said logical circuits.

18. A circuit according to claim 17, including an individual bridge circuit connected to each of said current sources, an individual flip-flop controlling each of said bridge circuits, the reversals of said supply current to each of said flip-flops being simultaneous with the reversals of said source of alternating current, and transfer circuit controlling said selecting means and said flip-flops such that the flip-flop associated with the source of current not connected to the output reverses its state at the reversal of the source of alternating current.

References Cited by the Examiner
UNITED STATES PATENTS

| | | | |
|---|---|---|---|
| 3,062,968 | 11/1962 | McMahon | 307—88.5 |
| 3,128,412 | 4/1964 | Abromaitis | 328—206 X |
| 3,185,862 | 5/1965 | Beesley | 307—88.5 |

ARTHUR GAUSS, *Primary Examiner.*

J. ZAZWORSKY, *Assistant Examiner.*